United States Patent
Campbell (10) Patent No.: US 11,790,215 B2
(45) Date of Patent: Oct. 17, 2023

(54) SYSTEMS AND METHODS FOR OBJECT DETECTION AND DATA EXTRACTION USING NEURAL NETWORKS

(71) Applicant: FMR LLC, Boston, MA (US)

(72) Inventor: Connor Campbell, Boston, MA (US)

(73) Assignee: FMR LLC, Boston, MA (US)

( * ) Notice: Subject to any disclaimer, the term of this patent is extended or adjusted under 35 U.S.C. 154(b) by 59 days.

(21) Appl. No.: 17/592,427

(22) Filed: Feb. 3, 2022

(65) Prior Publication Data
US 2023/0244908 A1    Aug. 3, 2023

(51) Int. Cl.
*G06N 3/045* (2023.01)
*G06V 30/40* (2022.01)

(52) U.S. Cl.
CPC ............. *G06N 3/045* (2023.01); *G06V 30/40* (2022.01)

(58) Field of Classification Search
CPC ................................ G06N 3/045; G06V 30/40
See application file for complete search history.

(56) References Cited

U.S. PATENT DOCUMENTS

| | | |
|---|---|---|
| 10,762,287 B2 | 9/2020 | Shah et al. |
| 10,896,357 B1 | 1/2021 | Corcoran et al. |
| 10,949,661 B2 | 3/2021 | Bhotika et al. |
| 2019/0385054 A1 * | 12/2019 | Zuev ..................... G06F 40/30 |

OTHER PUBLICATIONS

Dixon et al. "G-learner and girl: Goal based wealth management with reinforcement learning." arXiv preprint arXiv:2002.10990 (2020).
Sutton et al. "Reinforcement Learning: An Introduction" Second Edition, The MIT Press, 352 pages.

* cited by examiner

*Primary Examiner* — King Y Poon
*Assistant Examiner* — Michael L Burleson
(74) *Attorney, Agent, or Firm* — Cesari & McKenna, LLP (57) ABSTRACT

Systems and methods for extracting data values from electronic documents using neural networks. The method includes receiving an electronic document having data values and associated field identifiers, determining pixel coordinates corresponding to the field identifiers using a first neural network, and extracting the field identifiers located at the pixel coordinates using a second neural network. The method also includes, for each of the field identifiers, calculating pixel coordinates on the electronic document corresponding to a data value associated with the field identifier using a third neural network and extracting the data value located at the calculated pixel coordinates using the second neural network. The method further includes, for each of the data values, generating a record in a data structure, the record including the extracted value and the extracted field identifier. The method also includes storing the data structure including the records in a database.

20 Claims, 7 Drawing Sheets

FINANCIAL AND OPERATIONAL COMBINED UNIFORM SINGLE REPORT
PART II

| BROKER OR DEALER | | | |
|---|---|---|---|
| | N2 | | [100] |

STATEMENT OF FINANCIAL CONDITION as of (MM/DD/YY)  06/30/15  [99]
SEC FILE NO.  8-12242  [98]

Consolidated ☐ [198]
Unconsolidated ☒ [199]

ASSETS

| | Allowable | | Nonallowable | | Total | |
|---|---|---|---|---|---|---|
| 1. Cash ........................................... | $ 577,417,962 | [200] | | | $ 577,417,962 | [750] |
| 2. Cash segregated in compliance with federal and other regulations ........ | 68,557,209 | [210] | | | 68,557,209 | [760] ← 304 |
| 3. Receivable from brokers or dealers and clearing organizations: | | | | | | |
| A. Failed to deliver: | | | | | | |
| 1. Includable in "Formula for Reserve Requirements" ........ | 2,210,977 | [220] | | | | |
| 2. Other ........................ | 455,750,858 | [230] | | | 457,961,835 | [770] |
| B. Securities borrowed: | | | | | | |
| 1. Includable in "Formula for Reserve Requirements" ........ | 414,054,132 | [240] | | | | |
| 2. Other ........................ | 2,459,960,135 | [250] | | | 2,874,014,267 | [780] |
| C. Omnibus accounts: | | | | | | |
| 1. Includable in "Formula for Reserve Requirements" ........ | 0 | [260] | | | | |
| 2. Other ........................ | 0 | [270] | | | 0 | [790] |
| D. Clearing Organizations: | | | | | | |
| 1. Includable in "Formula for Reserve Requirements" ........ | 0 | [280] | | | | |
| 2. Other ........................ | 103,078,689 | [290] | | | 103,078,689 | [800] |
| E. Other ........................ | 53,353,809 | [300] | $ 531,525 | [550] | 53,885,334 | [810] |

SYSTEMS AND METHODS FOR OBJECT DETECTION AND DATA EXTRACTION USING NEURAL NETWORKS

FIELD OF THE INVENTION

The present invention relates generally to systems and methods for detecting objects on electronic documents, including systems and methods for extracting data values from electronic documents using neural networks.

BACKGROUND OF THE INVENTION

Many organizations use software tools to extract data from electronic documents. When done manually, data extraction from electronic documents may appear to be a simple process. But when an electronic device has to perform this task with high accuracy, most of the software tools fail to extract proper information. Generally, sensitive data is manually transcribed from scanned images of electronic documents into a digital format. This requires a significant amount of labor hours and delays the ingestion of information. Therefore, there is a need for a software tool that is able to extract sensitive data from any type of electronic document with high accuracy and is capable of being applied to various applications of textual information retrieval by providing relevant training data.

SUMMARY OF THE INVENTION

Accordingly, an object of the invention is to provide systems and methods for extracting data from electronic documents. It is an object of the invention to provide systems and methods for extracting data values from semi-structured electronic documents. It is an object of the invention to provide systems and methods for extracting data values from semi-structured electronic documents using neural networks. It is an object of the invention to provide systems and methods for generating and storing a data structure including the extracted data values in a database.

In some aspects, a computerized method for extracting data values from semi-structured electronic documents using neural networks includes receiving a semi-structured electronic document including data values and field identifiers associated with the data values. The computerized method also includes determining pixel coordinates on the semi-structured electronic document corresponding to the field identifiers using a first neural network. The computerized method also includes extracting the field identifiers located at the determined pixel coordinated using a second neural network.

The computerized method further includes, for each of the extracted field identifiers, calculating pixel coordinates on the semi-structured electronic document corresponding to a data value associated with the field identifier using a third neural network. The computerized method also includes, for each of the data values, extracting the data value located at the calculated pixel coordinates on the semi-structured electronic document using the second neural network. The computerized method further includes, for each of the data values, generating a record in a data structure, the record including the extracted data value and the extracted field identifier associated with the extracted data value.

In some embodiments, the computerized method includes storing the data structure including the records in a database. In other embodiments, the computerized method includes generating for display the extracted data value and the extracted field identifier associated with the extracted data value on a user device.

In some embodiments, the computerized method includes, for each of the field identifiers, eliminating pixelated data surrounding the pixel coordinates on the semi-structured electronic document corresponding to the field identifier. For example, in some embodiments, the computerized method includes extracting the field identifier located at the pixel coordinates using the second neural network.

In other embodiments, the computerized method includes, for each of the data values, masking the field identifier associated with the data value. For example, in some embodiments, the computerized method includes eliminating pixelated data surrounding the pixel coordinates on the semi-structured electronic document corresponding to the data value. In some embodiments, the computerized method includes extracting the data value located at the pixel coordinates using the second neural network.

In some embodiments, the neural networks are configured to extract data from the semi-structured electronic document using reinforcement learning feedback. In some embodiments, the semi-structured electronic document is a scanned image. In some embodiments, the semi-structured electronic document includes digital labels corresponding to the field identifiers. For example, in some embodiments, the computerized method includes determining the pixel coordinates on the semi-structured electronic document corresponding to the field identifiers based on the digital labels.

In some aspects, a system for extracting data values from semi-structured electronic documents using neural networks includes a server computing device communicatively coupled to a user device and a database over a network. The server computing device is configured to receive a semi-structured electronic document from the database including data values and field identifiers associated with the data values. The server computing device is also configured to determine pixel coordinates on the semi-structured electronic document corresponding to the field identifiers using a first neural network. The server computing device is also configured to extract the field identifiers located at the determined pixel coordinates using a second neural network.

The server computing device is further configured to, for each of the extracted field identifiers, calculate pixel coordinates on the semi-structured electronic document corresponding to a data value associated with the field identifier using a third neural network. The server computing device is also configured to, for each of the data values, extract the data value located at the calculated pixel coordinates on the semi-structured electronic document using the second neural network. The server computing device is further configured to, for each of the data values, generate a record in a data structure, the record comprising the extracted data value and the extracted field identifier associated with the extracted data value.

In some embodiments, the server computing device is further configured to store the data structure including the records in the database. In other embodiments, the server computing device is further configured to generate for display the extracted data value and the extracted field identifier associated with the extracted data value on the user device.

In some embodiments, the server computing device is further configured to, for each of the field identifiers, eliminate pixelated data surrounding the pixel coordinates on the semi-structured electronic document corresponding to the field identifier. For example, in some embodiments, the server computing device is further configured to extract the field identifier located at the pixel coordinates using the second neural network.

In other embodiments, the server computing device is further configured to, for each of the data values, mask the field identifier associated with the data value. For example, in some embodiments, the server computing device is further configured to eliminate pixelated data surrounding the pixel coordinates on the semi-structured electronic document corresponding to the data value. In some embodiments, the server computing device is further configured to extract the data value located at the pixel coordinates using the second neural network.

In some embodiments, the neural networks are configured to extract data from the semi-structured electronic document using reinforcement learning feedback. In some embodiments, the semi-structured electronic document is a scanned image. In some embodiments, the semi-structured electronic document includes digital labels corresponding to the field identifiers. For example, in some embodiments, the server computing device is further configured to determine the pixel coordinates on the semi-structured electronic document corresponding to the field identifiers based on the digital labels.

Other aspects and advantages of the invention can become apparent from the following drawings and description, all of which illustrate the principles of the invention, by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION OF THE INVENTION

In some aspects, the systems and methods described herein can include one or more mechanisms or methods for extracting data from electronic documents. The systems and methods described herein can include mechanisms or methods for extracting data values from semi-structured electronic documents. The systems and methods described herein can include mechanisms or methods for extracting data values from semi-structured electronic documents using neural networks. The systems and methods described herein can include mechanisms or methods for generating and storing a data structure including the extracted data values in a database.

Figure 1:
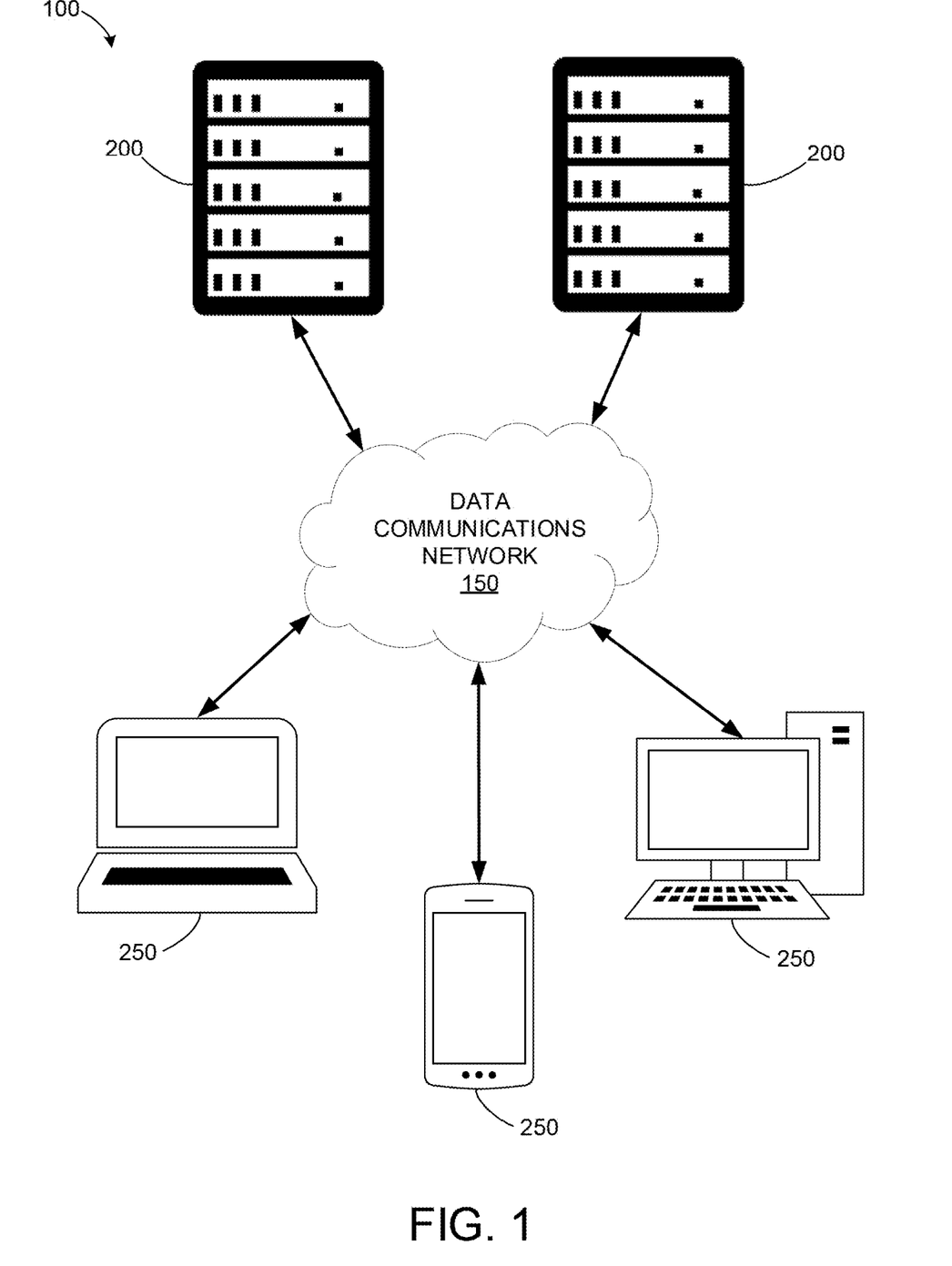
FIG. 1 is a block diagram of an exemplary data communications network, according to embodiments of the technology described herein.
Figure 2:
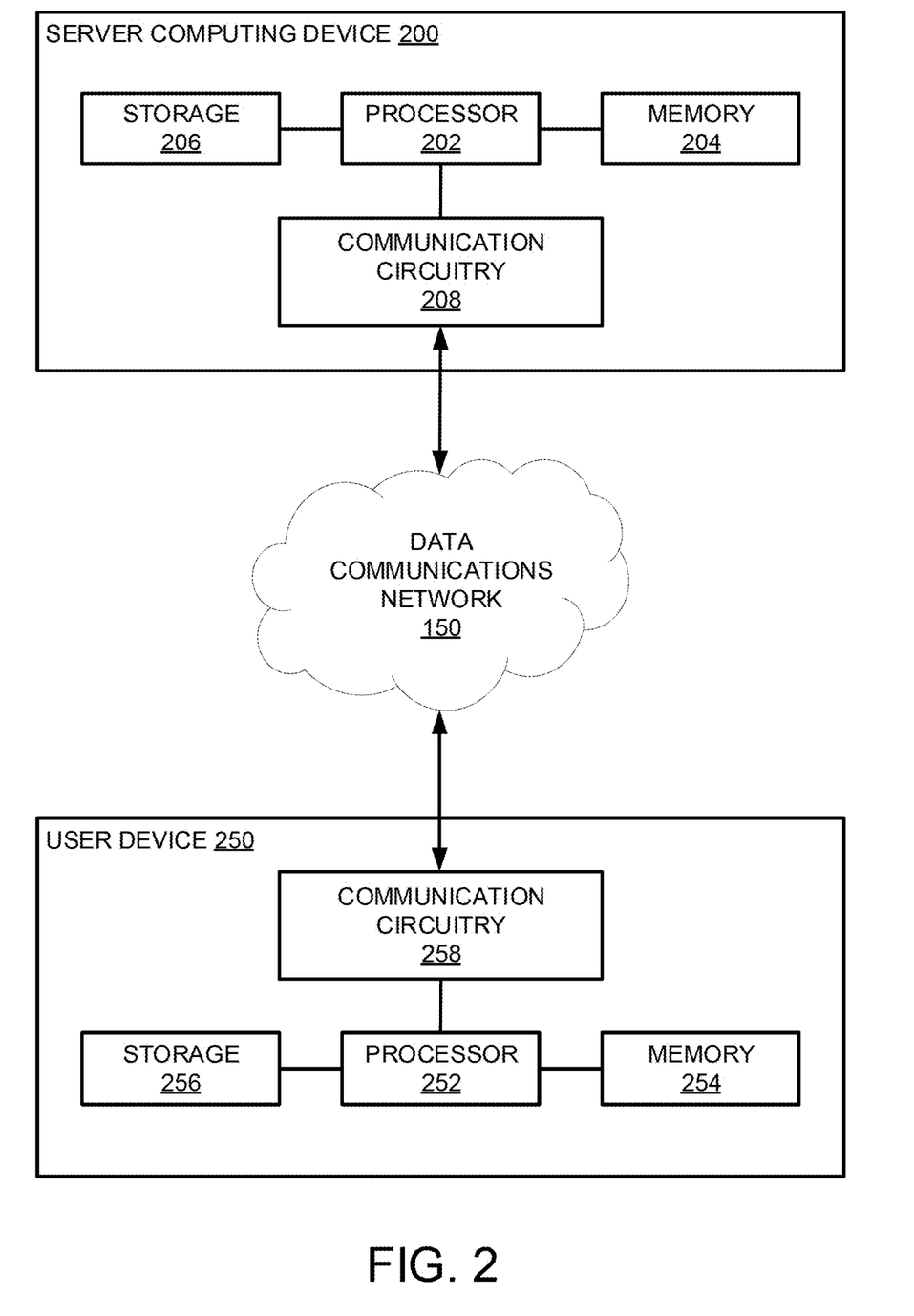
FIG. 2 is a block diagram of an exemplary server computing device and an exemplary user device, according to embodiments of the technology described herein.

The systems and methods described herein can be implemented using a data communications network, server computing devices, and mobile devices. For example, referring to FIGS. 1 and 2, an exemplary communications system 100 includes data communications network 150, exemplary server computing devices 200, and exemplary user devices 250. In some embodiments, the system 100 includes one or more server computing devices 200 and one or more user devices 250. Each server computing device 200 can include a processor 202, memory 204, storage 206, and communication circuitry 208. Each user device 250 can include a processor 252, memory 254, storage 256, and communication circuitry 258. In some embodiments, communication circuitry 208 of the server computing devices 200 is communicatively coupled to the communication circuitry 258 of the user devices 250 via data communications network 150. Communication circuitry 208 and communication circuitry 258 can use Bluetooth, Wi-Fi, or any comparable data transfer connection. The user devices 250 can include personal workstations, laptops, tablets, mobile devices, or any other comparable device.

Figure 3:
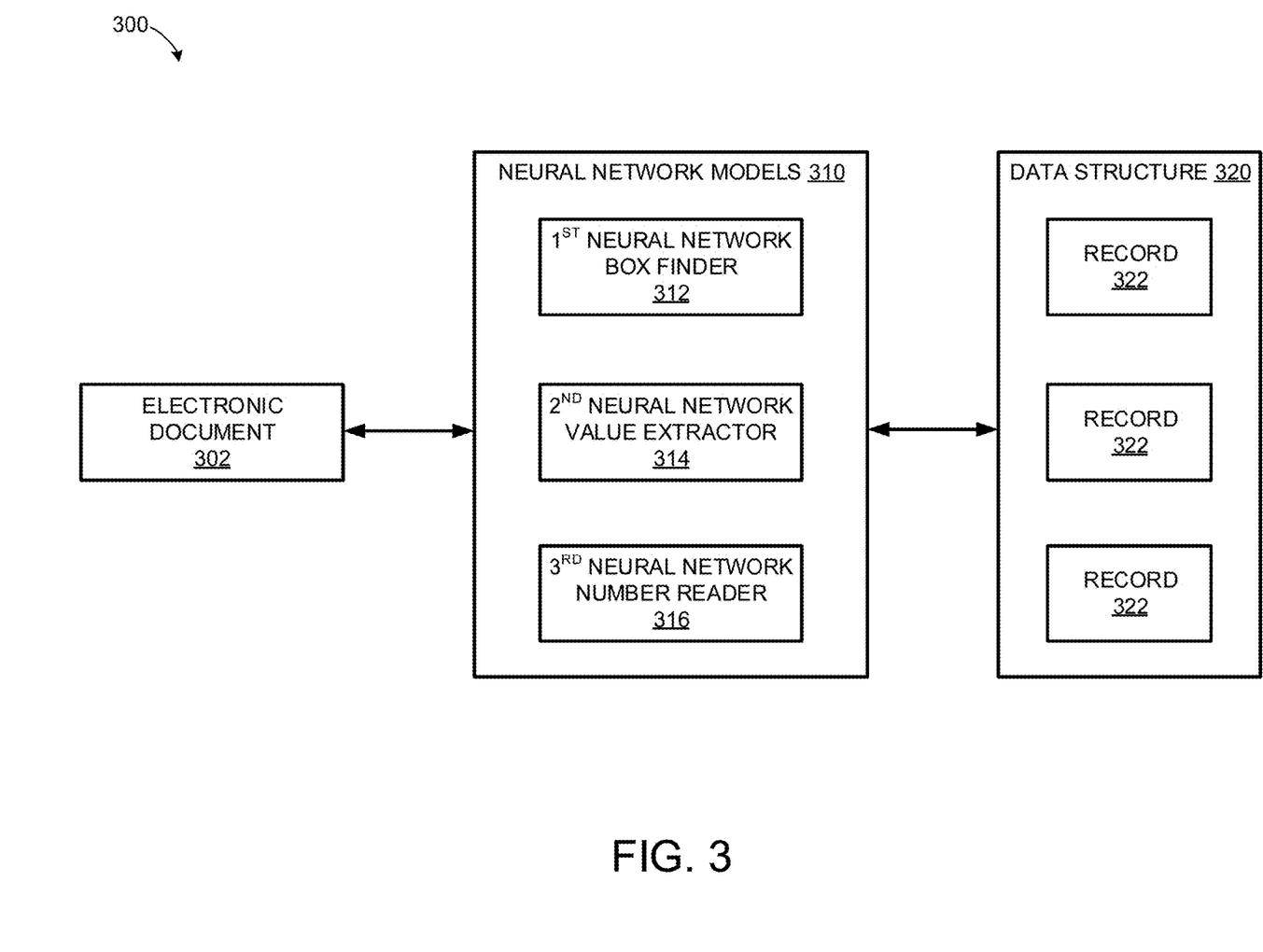
FIG. 3 is a block diagram of an exemplary system for extracting data values from electronic documents using neural networks, according to embodiments of the technology described herein.
Figure 4:
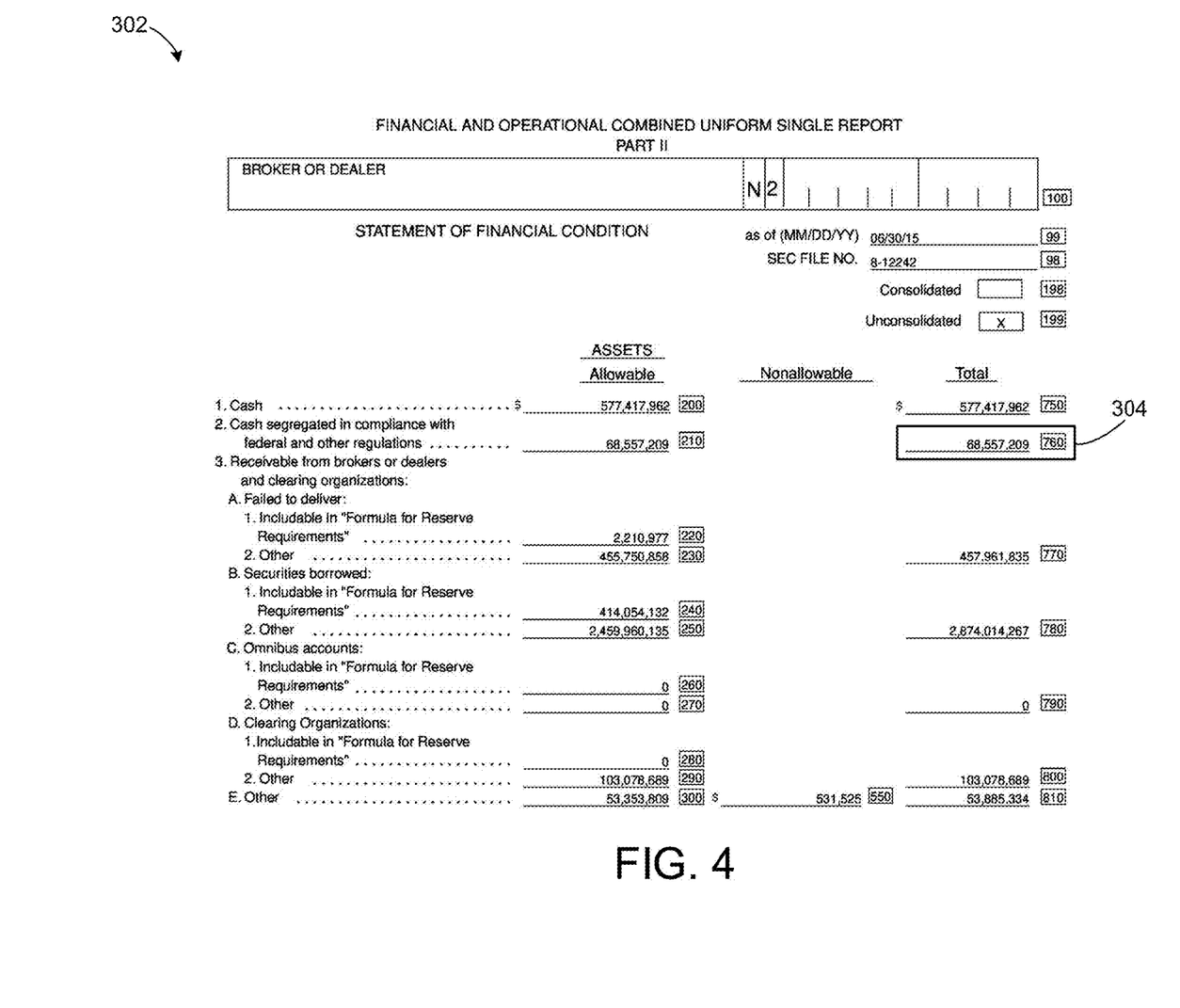
FIG. 4 is an exemplary semi-structured electronic document including data values and field identifiers, according to embodiments of the technology described herein.
Figure 5:
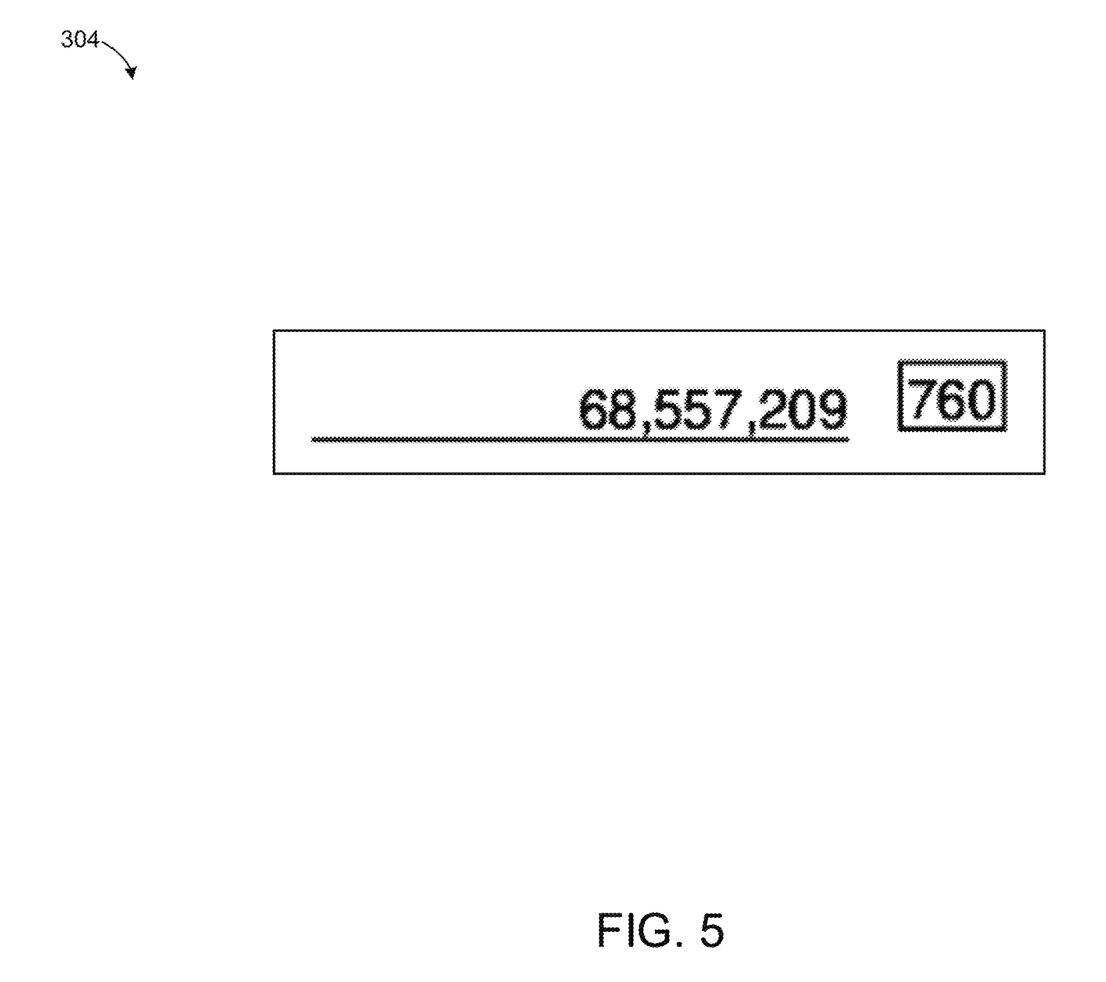
FIG. 5 is an exemplary area of the semi-structured electronic document of FIG. 4 including a data value-field identifier pair, according to embodiments of the technology described herein.

Referring to FIG. 3, a system 300 for extracting data values from electronic documents 302 includes neural network models 310 and data structure 320. In some embodiments, neural network models 310 and data structure 320 can be implemented on one or more server computing devices 200. In some embodiments, the electronic document 302 can be a semi-structured electronic document. For example, referring to FIGS. 4 and 5, the electronic document 302 can include data values and field identifiers associated with the data values. As shown in FIG. 5, system 300 is configured to locate and isolate data value-field identifier pairs 304.

Neural networks models 310 includes various neural networks tasked with extracting data values from electronic documents 302. Neural network models 310 can include a first neural network 312 corresponding to a box finder task, a second neural network 314 corresponding to a value extractor task, and a third neural network 316 corresponding to a number reader task. In some embodiments, neural network models 310 can include additional neural networks. Data structure 320 includes one or more records 322. Each record 322 includes the extracted data of a data value-field identifier pair 304.

The neural network models 310 can be implemented using supervised learning and/or machine learning algorithms. Supervised learning is the machine learning task of learning a function that maps an input to an output based on example input-output pairs. It infers a function from labeled training data consisting of a set of training examples. Each example is a pair consisting of an input object and a desired output value. A supervised learning algorithm or machine learning algorithm analyzes the training data and produces an inferred function, which can be used for mapping new examples.

In addition to supervised learning, the neural network models 310 can be implemented with a reinforcement learning feedback mechanism to increase the accuracy of the extracted data values. The reinforcement learning feedback mechanism involves the optimization of the interaction between the neural network models 310 and the extracted data values. At each of a sequence of discrete time steps during which the neural network models 310 extract a data value, the neural networks receive feedback corresponding to the accuracy of the extracted data value. With that feedback, the neural network models 310 can implement improvements or adjustments that can improve the accuracy of the extracted data values, and optimize the interaction loop.

Figure 6:
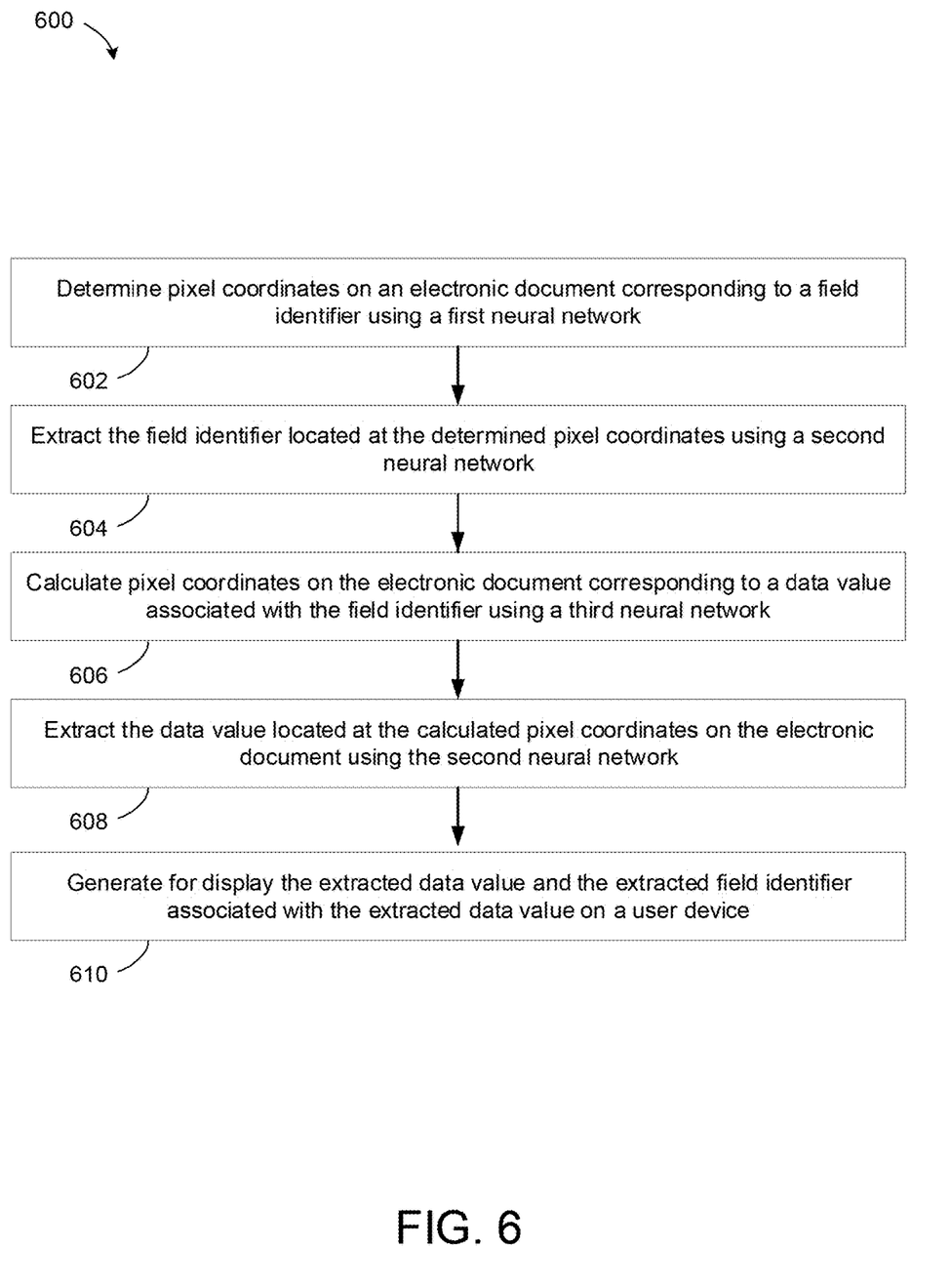
FIG. 6 is a flow diagram of a computer-implemented method for extracting data values from electronic documents using neural networks, according to embodiments of the technology described herein.

System 300 can be used to extract data values from electronic documents 302 using neural networks 310. For example, referring to FIG. 6, a process 600 for extracting data values from electronic documents 302 using neural networks 310 includes determining pixel coordinates on an electronic document 302 corresponding to a field identifier using a first neural network 312 in step 602. Process 600 continues by extracting the field identifier located at the determined pixel coordinates using a second neural network 314 in step 604. Process 600 then continues by calculating pixel coordinates on the electronic document 302 corresponding to a data value associated with the field identifier using a third neural network 316 in step 606. Process 600 continues by extracting the data value located at the calculated pixel coordinates on the electronic document 302 using the second neural network 314 in step 608. Process 600 finishes by generating for display the extracted data value and the extracted field identifier associated with the extracted data value on a user device 250 in step 610.

Figure 7:
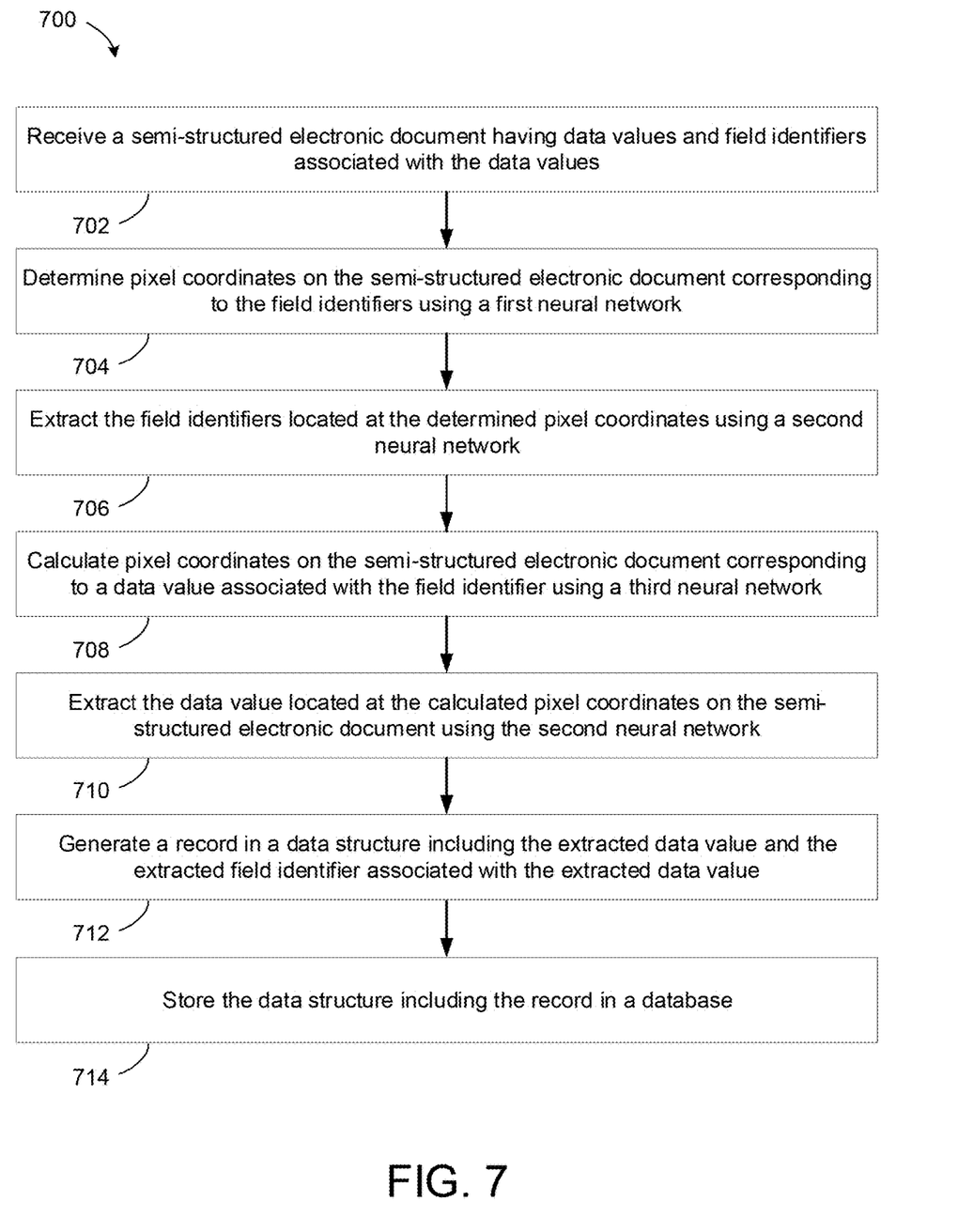
FIG. 7 is a flow diagram of a computer-implemented method for extracting data values from semi-structured electronic documents using neural networks, according to embodiments of the technology described herein.

Referring to FIG. 7, a process 700 for extracting data values from semi-structured electronic documents 302 using neural networks 310 includes receiving a semi-structured electronic document 302 including data values and field identifiers associated with the data values 304 in step 702. In some embodiments, the semi-structured electronic document 302 is a scanned image.

Process 700 continues by determining pixel coordinates on the semi-structured electronic document 302 corresponding to the field identifiers using a first neural network 312 in step 704. In some embodiments, the semi-structured electronic document 302 includes digital labels corresponding to the field identifiers. For example, in some embodiments, process 700 includes determining the pixel coordinates on the semi-structured electronic document 302 corresponding to the field identifiers based on the digital labels.

Process 700 continues by extracting the field identifiers located at the determined pixel coordinated using a second neural network 314 in step 706. In some embodiments, process 700 includes, for each of the field identifiers, eliminating pixelated data surrounding the pixel coordinates on the semi-structured electronic document 302 corresponding to the field identifier. For example, in some embodiments, the process 700 includes extracting the field identifier located at the pixel coordinates using the second neural network 314.

Process 700 continues by, for each of the extracted field identifiers, calculating pixel coordinates on the semi-structured electronic document 302 corresponding to a data value associated with the field identifier using a third neural network 316 in step 708. Process 700 continues by, for each of the data values, extracting the data value located at the calculated pixel coordinates on the semi-structured electronic document 302 using the second neural network 314 in step 710. In some embodiments, process 700 includes, for each of the data values, masking the field identifier associated with the data value. For example, in some embodiments, the process 700 includes eliminating pixelated data surrounding the pixel coordinates on the semi-structured electronic document 302 corresponding to the data value. In some embodiments, process 700 includes extracting the data value located at the pixel coordinates using the second neural network 314. In some embodiments, the neural networks 310 are configured to extract data from the semi-structured electronic document 302 using reinforcement learning feedback.

Process 700 continues by, for each of the data values, generating a record 322 in a data structure 320 in step 712. The record 322 including the extracted data value and the extracted field identifier associated with the extracted data value. Process 700 finishes by storing the data structure 320 including the records 322 in a database in step 714. In some embodiments, process 700 includes generating for display the extracted data value and the extracted field identifier associated with the extracted data value on a user device 250.

Process 700 can be implemented using system 300 for extracting data values from semi-structured electronic documents 302 using neural networks 310. System 300 can include a server computing device 200 communicatively coupled to a user device 250 and a database over a network 150. The database can be implemented using a server computing device 200. The server computing device 200 is configured to receive a semi-structured electronic document 302 from the database including data values and field identifiers associated with the data values. The server computing device 200 is also configured to determine pixel coordinates on the semi-structured electronic document 302 corresponding to the field identifiers using a first neural network 312. The server computing device 200 is also configured to extract the field identifiers located at the determined pixel coordinates using a second neural network 314.

The server computing device 200 is further configured to, for each of the extracted field identifiers, calculate pixel coordinates on the semi-structured electronic document 302 corresponding to a data value associated with the field identifier using a third neural network 316. The server computing device 200 is also configured to, for each of the data values, extract the data value located at the calculated pixel coordinates on the semi-structured electronic document 302 using the second neural network 314. The server computing device 200 is further configured to, for each of the data values, generate a record 322 in a data structure 320, the record 322 comprising the extracted data value and the extracted field identifier associated with the extracted data value.

In some embodiments, the neural networks 310 are configured to extract data from the semi-structured electronic document 302 using reinforcement learning feedback. In some embodiments, the server computing device 200 is further configured to store the data structure 320 including the records 322 in the database. In other embodiments, the server computing device 200 is further configured to generate for display the extracted data value and the extracted field identifier associated with the extracted data value on the user device 250.

In some embodiments, the server computing device 200 is further configured to, for each of the field identifiers, eliminate pixelated data surrounding the pixel coordinates on the semi-structured electronic document 302 corresponding to the field identifier. For example, in some embodiments, the server computing device 200 is further configured to extract the field identifier located at the pixel coordinates using the second neural network 314.

In other embodiments, the server computing device 200 is further configured to, for each of the data values, mask the field identifier associated with the data value. For example, in some embodiments, the server computing device 200 is further configured to eliminate pixelated data surrounding the pixel coordinates on the semi-structured electronic document 302 corresponding to the data value. In some embodiments, the server computing device 200 is further configured to extract the data value located at the pixel coordinates using the second neural network 314.

In some embodiments, the semi-structured electronic document 302 is a scanned image. In some embodiments, the semi-structured electronic document 302 includes digital labels corresponding to the field identifiers. For example, in some embodiments, the server computing device 200 is further configured to determine the pixel coordinates on the semi-structured electronic document 302 corresponding to the field identifiers based on the digital labels.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed:

1. A computerized method for extracting data values from semi-structured electronic documents using a plurality of neural networks, the method comprising:
   receiving, by a server computing device, a semi-structured electronic document comprising a plurality of data values and a plurality of field identifiers associated with the plurality of data values;
   determining, by the server computing device, a plurality of pixel coordinates on the semi-structured electronic document corresponding to the plurality of field identifiers using a first neural network of the plurality of neural networks;
   extracting, by the server computing device, the plurality of field identifiers located at the plurality of pixel coordinates using a second neural network of the plurality of neural networks;
   for each of the plurality of field identifiers, calculating, by the server computing device, pixel coordinates on the semi-structured electronic document corresponding to a data value of the plurality of data values associated with the field identifier using a third neural network of the plurality of neural networks;
   for each of the plurality of data values, extracting, by the server computing device, the data value located at the calculated pixel coordinates on the semi-structured electronic document using the second neural network;
   for each of the plurality of data values, generating, by the server computing device, a record of a plurality of records in a data structure, the record comprising the extracted data value and the extracted field identifier associated with the extracted data value; and
   storing, by the server computing device, the data structure comprising the plurality of records in a database.

2. The computerized method of claim 1, further comprising:
   for each of the plurality of field identifiers, eliminating, by the server computing device, pixelated data surrounding the pixel coordinates on the semi-structured electronic document corresponding to the field identifier.

3. The computerized method of claim 2, further comprising:
   extracting, by the server computing device, the field identifier located at the pixel coordinates using the second neural network.

4. The computerized method of claim 1, further comprising:
   for each of the plurality of data values, masking, by the server computing device, the field identifier associated with the data value.

5. The computerized method of claim 4, further comprising:
   for each of the plurality of data values, eliminating, by the server computing device, pixelated data surrounding the pixel coordinates on the semi-structured electronic document corresponding to the data value.

6. The computerized method of claim 5, further comprising:
   extracting, by the server computing device, the data value located at the pixel coordinates using the second neural network.

7. The computerized method of claim 1, wherein the plurality of neural networks are configured to extract data from the semi-structured electronic document using reinforcement learning feedback.

8. The computerized method of claim 1, wherein the semi-structured electronic document comprises a plurality of digital labels corresponding to the plurality of field identifiers.

9. The computerized method of claim 8, wherein the server computing device is configured to determine the plurality of pixel coordinates on the semi-structured electronic document corresponding to the plurality of field identifiers based on the plurality of digital labels.

10. The computerized method of claim 1, further comprising:
    for each of the plurality of data values, generating, by the server computing device, for display the extracted data value and the extracted field identifier associated with the extracted data value on a user device.

11. A system for extracting data values from semi-structured electronic documents using a plurality of neural networks, the system comprising:
    a server computing device communicatively coupled to a user device and a database over a network, the server computing device configured to:
    receive a semi-structured electronic document from the database comprising a plurality of data values and a plurality of field identifiers associated with the plurality of data values;
    determine a plurality of pixel coordinates on the semi-structured electronic document corresponding to the plurality of field identifiers using a first neural network of the plurality of neural networks;

extract the plurality of field identifiers located at the plurality of pixel coordinates using a second neural network of the plurality of neural networks;

for each of the plurality of field identifiers, calculate pixel coordinates on the semi-structured electronic document corresponding to a data value of the plurality of data values associated with the field identifier using a third neural network of the plurality of neural networks;

for each of the plurality of data values, extract the data value located at the calculated pixel coordinates on the semi-structured electronic document using the second neural network;

for each of the plurality of data values, generate a record of a plurality of records in a data structure, the record comprising the extracted data value and the extracted field identifier associated with the extracted data value; and store the data structure comprising the plurality of records in the database.

12. The system of claim 11, wherein the server computing device is configured to:

for each of the plurality of field identifiers, eliminate pixelated data surrounding the pixel coordinates on the semi-structured electronic document corresponding to the field identifier.

13. The system of claim 12, wherein the server computing device is configured to:

extract the field identifier located at the pixel coordinates using the second neural network.

14. The system of claim 11, wherein the server computing device is configured to:

for each of the plurality of data values, mask the field identifier associated with the data value.

15. The system of claim 14, wherein the server computing device is configured to:

for each of the plurality of data values, eliminate pixelated data surrounding the pixel coordinates on the semi-structured electronic document corresponding to the data value.

16. The system of claim 15, wherein the server computing device is configured to:

extract the data value located at the pixel coordinates using the second neural network.

17. The system of claim 11, wherein the plurality of neural networks are configured to extract data from the semi-structured electronic document using reinforcement learning feedback.

18. The system of claim 11, wherein the semi-structured electronic document comprises a plurality of digital labels corresponding to the plurality of field identifiers.

19. The system of claim 18, wherein the server computing device is configured to:

determine the plurality of pixel coordinates on the semi-structured electronic document corresponding to the plurality of field identifiers based on the plurality of digital labels.

20. The system of claim 11, wherein the server computing device is configured to: for each of the plurality of data values, generate for display the extracted data value and the extracted field identifier associated with the extracted data value on the user device.

* * * * *